UNITED STATES PATENT OFFICE.

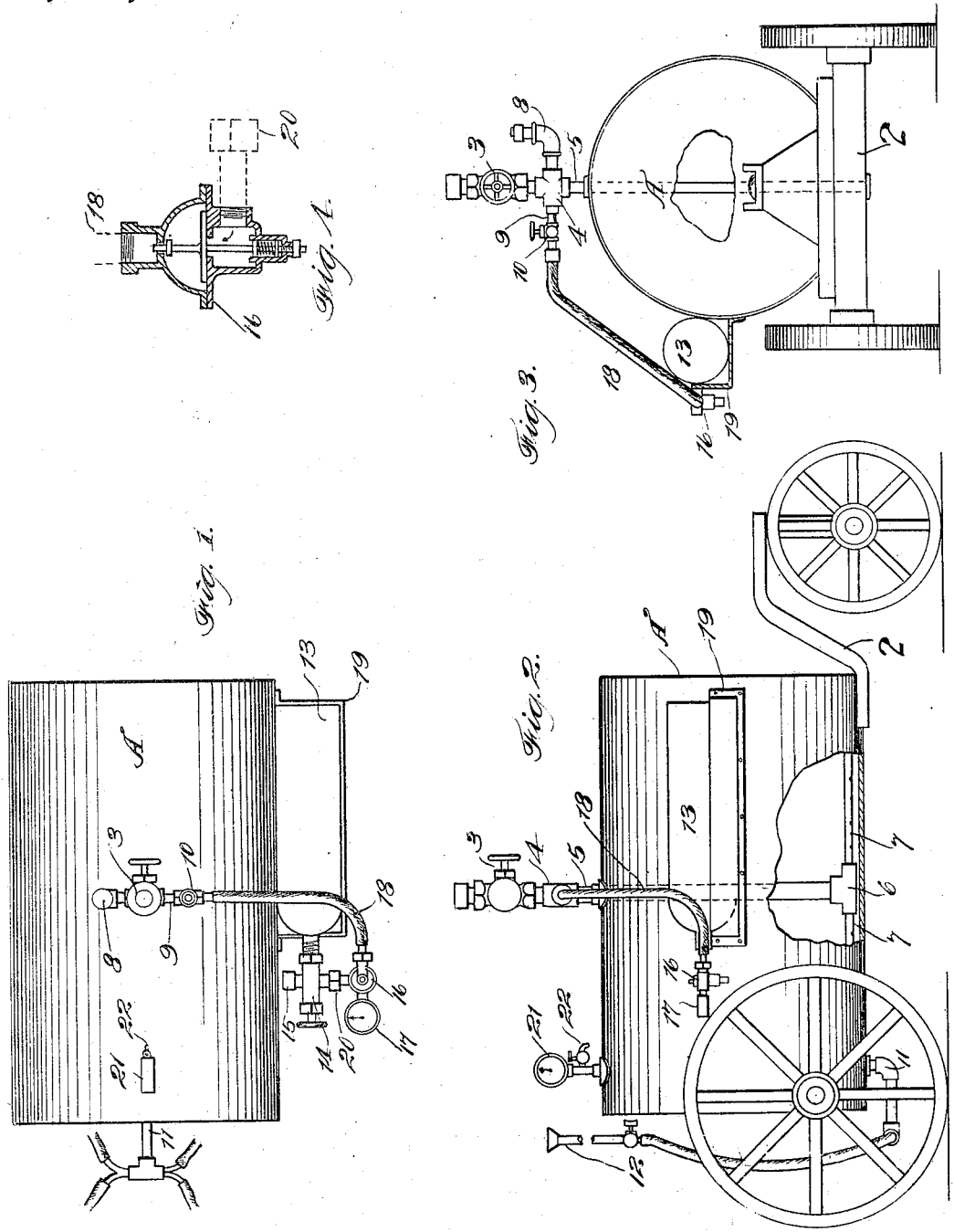

THEODORE EDER, OF PERKINS, CALIFORNIA, ASSIGNOR TO THE PEOPLE OF THE UNITED STATES.

SPRAYING DEVICE.

1,046,572.   Specification of Letters Patent.   Patented Dec. 10, 1912.

Application filed March 20, 1909. Serial No. 484,784.
(DEDICATED TO THE PUBLIC.)

*To all whom it may concern:*

Be it known that I, THEODORE EDER, a citizen of the United States, residing at Perkins, in the county of Sacramento and State of California, have invented new and useful Improvements in Spraying Devices, of which the following is a specification.

This application is made under the act of March 3, 1883, Chapter 143 (22 Stat., 625), and the invention herein described and claimed may be used by the Government of the United States or any of its officers or employees in the prosecution of work for the United States, or by any person in the United States, without the payment of any royalty thereon.

This invention relates to the spraying of hop vines and the like, for the purpose of destroying the plant parasites.

The object of the invention is to provide a simple, cheap and practical device for spraying plants and trees, which will avoid the usual cumbrous power apparatus, and the uncertain hand outfits, all as will be more fully explained hereinafter.

In the growing of hops the vines are trained to grow on overhead wires and supporting strings, and the hops often attain a height of from fifteen to twenty feet, and grow in very thick masses. It is not possible to spray these vines from a vehicle which is moving continuously, and consequently, pumps which are operated by the wheels of the moving vehicle are impractical for this purpose, besides being cumbersome and heavy, and requiring several horses for traction.

I have designed an apparatus which can be operated anywhere, and under any conditions, and for any length of time within the capacity of the apparatus; which will require a minimum amount of power to move it about the field, and which will accomplish the work successfully, in a manner different from, and superior to, any now in practical use.

The invention consists of the parts and the construction and combination of parts as hereinafter more fully described and claimed, having reference to the accompanying drawings, in which—

Figure 1 is a plan of the apparatus. Fig. 2 is a side elevation, partly in section. Fig. 3 is an end elevation. Fig. 4 is a section of a suitable adjustable regulating valve.

The present apparatus includes a solution tank A adapted to contain the spraying liquid. This tank is of suitable size, shape and material, and mounted upon the wheeled vehicle 2. I have found that satisfactory results are obtained when tank A is built of sheet iron ¼ inch shell and 3/16 inch heads and tested to 150 pounds pressure, and has a capacity of about 250 gallons of mixed spray ready to be applied. The tank is filled through a suitable valve 3 at the top, which connects with the cross 4 which in turn screws on to a pipe 5 which penetrates the interior of the tank A and extends close to the bottom thereof, and carries a T 6, into which are screwed the perforated pipes 7. These pipes 7 extend lengthwise of the tank and in close juxtaposition to the bottom thereof, and are perforated on their under side.

One arm of the cross 4 carries a safety valve 8, and the opposite arm carries a small ⅜ inch pipe 9 provided with a regulating air valve 10. When air under pressure is let in through the pipe 9, it escapes through the underneath perforations in the pipes 7 to cause an agitation of the liquid and the material in suspension within the tank. The liquid thus placed under pressure is discharged from the tank through the outlet pipe 11, and thence through one or more spray nozzles 12.

One of the important features of this invention is the means for producing the necessary air pressure in the spray tank A. Preferably, I employ an air bottle or reservoir 13, charged to a working pressure of from 750 to 1000 pounds. These air bottles are best made of pressed steel, though riveted and brazed seams would answer, and a convenient size is the bottle that will hold about one cubic foot of air. These bottles should all be tested to 3000 pounds hydraulic pressure, if they are to be charged to the working pressure above-mentioned. Each bottle is provided with a two-way high pressure valve 14, one outlet being capped, as shown at 15, and the other outlet connected to an adjustable reducing valve 16 having a gage 17, and connected with the tank A by means of the ⅜ inch pressure hose 18 to take care of any vibration that otherwise might cause leaks in the air line.

The air bottle is supported in any suitable fashion on the side of the tank, preferably, as here shown, being disposed horizontally, and resting in a sheet-metal box 19 riveted on to the tank. The connection between the reducing valve and the air bottle is by a suitable, quick-acting, high pressure bronze coupling 20, so as to enable an air bottle to be quickly connected to, or disconnected from, the tank. Whenever one outlet for the valve 14 becomes worn where it is connected to the coupling 20, the cap 15 is taken off from the other outlet, the valve reversed, and the cap screwed on to the worn threads of the previously used outlet.

21 is a suitable pressure gage on the tank, and 22 is a pet-cock to enable the air in the tank to be blown off at any time, preparatory to filling.

In practice, the solution tank A having been filled with solution through the valve 3 and pipes 5 and 7, an air bottle 13 is placed in its rest 19 on the vehicle and connected with the tank. The valve 16 is adjusted so that the pressure on the tank side will be constant, say, 35, 60, 75, 100 or more pounds, as desired. The pressure adjustment can easily be changed while the air is passing from the bottle to the tank. The air from the storage bottle enters through the flexible connection 18 and small pipe 9, and is led down inside of the tank through the pipe 5 and discharged through the underneath perforations in pipe 7 against the cylindrical bottom of the spray tank. The object of this is to agitate the liquid and prevent settling of spraying solutions that hold substances such as lime, sulfur, Paris green, etc., in suspension. This method of agitation has a great advantage over mechanical agitation, since the air coming in constantly under pressure and then being forced against the concaved bottom of the tank, and rising, keeps the solution more completely agitated than slow-moving mechanical devices would, because, as a rule, these mechanical devices only affect certain parts of the spray tank. There is no objection to filling the tank and admitting the air through the same pipes as here shown.

An air bottle containing one cubic foot of air at 1000 pounds initial pressure (which is the equivalent of 66 feet of air under ordinary atmospheric pressure) will easily displace 250 gallons of spray and force it out of the tank at any desired pressure up to 100 pounds. If higher pressure were desired, the amount of spray forced out by one full air bottle would be slightly less; but there is nothing to prevent my changing an air bottle at any time without letting any of the air out of the tank, since the valve 10 permits this. Of course, it is desirable to make the spray tanks and bottles of such corresponding sizes that a full air bottle will empty a full tank of spray without changing, though a change could easily be accomplished by closing the valve 10 in the air line, without losing the air under pressure already in the spray tank.

The advantages of this present system of spraying are best appreciated by practical operation in the field. The average pressure obtained in hand-spraying is only from 35 to 40 pounds; and in power spraying it runs, as a rule, from 60 to 75 pounds. In hand-pumping outfits it is practically impossible to get a man capable of maintaining a steady pressure all day long; and with a pressure of from 35 to 40 pounds, it is impossible to reach high trees or vines, such as hops or the like. One man pumping can only supply one or two hose lines, and the ground covered in a day by such an apparatus is very limited. A power outfit overcomes part of this difficulty in that it furnishes sufficient spray for several hose lines, and also at the desired pressure in most cases; but draw-backs with power outfits are constant by reason of difficulties arising from the engine, running parts frequently catching in vines and limbs, and the greatly increased load caused by using a heavy engine and cooling tank. The engine trouble is caused by the continual change of position of the wagon, throwing the engine out of plumb; and while the same engine will run continuously if in a stationary position, it is a well-known fact to all persons acquainted with power spray devices that it takes a mechanic to keep the engine running on a portable apparatus. The air bottles are all charged at one central station at a very small cost, about three cents for power and engineer's labor, and can be coupled on to the spray tank by inexperienced labor, and when empty can be refilled an indefinite number of times. These bottles are practically indestructible, while the ordinary type of power outfit running in the open field gives but very poor service after the second or third year. While the spraying apparatus is being moved from tree to tree, or to a new lot of vines, there is no loss of air or efficiency, for as soon as the spray flow is stopped by the stop-cock in the hose line, the air stops entering the spray tank on account of the action of the reducing valve.

Having thus described my invention, what I claim and desire to secure by Letters Patent is—

A spraying device comprising a wheeled tank having a cross in the top thereof, a valved coupling on the top branch of the cross, a safety valve on one of the side branches of the cross, a valved coupling on the other side branch of the cross, a pressure reservoir carried on the side of the tank, a pipe connection between the pressure reservoir and the second mentioned valved coupling, a pressure regulator included in said pipe connection, a pipe leading downwardly from the cross and provided with perforate branch pipes within and adjacent the bottom of the tank, and a valved spray nozzle connected to a lower portion of the tank, substantially as described.

In testimony whereof, I have hereunto set my hand in presence of two subscribing witnesses.

THEODORE EDER.

Witnesses:
  HENRY P. TRICON,
  H. C. YAUDLE.